(12) United States Patent
Mehan

(10) Patent No.: US 9,281,668 B2
(45) Date of Patent: Mar. 8, 2016

(54) STRIPPING BLADES FOR CUTTING INSULATION

(71) Applicant: TYCO ELECTRONICS CORPORATION, Berwyn, PA (US)

(72) Inventor: Ashok K. Mehan, Union City, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 280 days.

(21) Appl. No.: 13/654,508

(22) Filed: Oct. 18, 2012

(65) Prior Publication Data

US 2014/0109410 A1    Apr. 24, 2014

(51) Int. Cl.
*H02G 1/12*    (2006.01)

(52) U.S. Cl.
CPC .......... *H02G 1/1212* (2013.01); *H02G 1/1241* (2013.01)

(58) Field of Classification Search
CPC ..... H02G 1/12; H02G 1/1209; H02G 1/1212; H02G 1/1224; H02G 1/1241; H02G 1/1256; H01B 15/005; G02B 6/4497
USPC .......... 81/9.41–9.44; 30/90.1, 90.4, 90.6, 357
See application file for complete search history.

(56) References Cited

U.S. PATENT DOCUMENTS

| | | | | |
|---|---|---|---|---|
| 2,179,581 | A * | 11/1939 | Voogd | 81/9.42 |
| 3,125,909 | A * | 3/1964 | Hindenburg | 81/9.42 |
| 3,735,649 | A * | 5/1973 | Staggs | 81/9.42 |
| 4,246,808 | A | 1/1981 | Sandy et al. | |
| 4,350,061 | A | 9/1982 | Isham et al. | |
| 4,485,696 | A * | 12/1984 | Bieganski | 81/9.41 |
| 5,269,206 | A * | 12/1993 | Yagawa | 81/9.51 |
| 6,089,125 | A | 7/2000 | Cheng | |
| 6,439,084 | B1 | 8/2002 | Ebert | |
| 6,439,085 | B1 | 8/2002 | Habermehl et al. | |
| 7,000,322 | B2 * | 2/2006 | Murphy | 81/9.41 |
| 2005/0028373 | A1 | 2/2005 | Murphy | |

OTHER PUBLICATIONS

International Search Report, International Application No. PCT/US2013/065338, International Filing Date, Oct. 17, 2013.
Aerospace Standard for Hand-Held Wire Stripper Tools, Aerospace Standard, The Engineering Society for Advancing Mobility Land Sea Air and Space International, Apr. 2002, 8 pgs.

* cited by examiner

*Primary Examiner* — Hadi Shakeri

(57) ABSTRACT

An insulation stripping assembly for stripping insulation from a conductor. The blade assembly includes a first blade assembly and a second blade assembly. The first blade assembly has a first cutting blade, and the second blade assembly has a second cutting blade. A clenching member is provided on at least one of the first blade assembly and the second blade assembly. The clenching member is spaced from the first cutting blade and the second cutting blade. The first and second cutting blade essentially cut through the insulation and the clenching member engages the insulation to provide increased pulling force to remove the cut insulation from the conductor.

10 Claims, 9 Drawing Sheets

STRIPPING BLADES FOR CUTTING INSULATION

FIELD OF THE INVENTION

The present invention is directed to stripping blades for stripping insulation material from an insulated wire. In particular, the invention is directed to stripping blades which provide an additional pulling force for removal of the stripped insulation material.

BACKGROUND OF THE INVENTION

When stripping the insulation or insulator of an electric wire, a wire stripper may be used. A conventional wire stripper includes blades which may be pivoted together and two jaws respectively formed integral with the blades at one end for acting against each other to strip the insulator of the electric wire. When the jaws are squeezed toward each other and against the electric wire, the insulator of the electric wire is cut by the cutting edge at each jaw, and then the wire stripper tool is pulled outwards from the electric wire, enabling the cut piece of insulator to be removed from the electric wire. However, when pulling the tool outwards from the electric wire, the blades tend to be biased, which may result in damage to the conductor of the electric wire.

In order to prevent damage to the conductor of the wire, various wire stripper devices have been developed. One such device is shown in U.S. Pat. No. 6,089,125. In this device, the wire stripper includes two pressure bars each having a fixed end pivoted to each other and a free end. Two wire stripping cutter assemblies are symmetrically provided at the free ends of the pressure bars for stripping the insulator of a two-line electric wire. An elongated cutter blade is fastened to one pressure bar and moved to act V-notches at the other pressure bar for stripping the insulator of electric wires of different diameters. The wire stripping cutter assemblies each have two symmetrical pairs of movable wire clamping plates respectively supported on a respective spring element, and forced by the respective spring element for holding down a two-line electric wire in position for stripping positively. This keeps the electric wire maintained perpendicular to the cutter blades, enabling the insulator of the electric wire to be positively stripped.

Another device which has the object of removing the insulation form an electrical wire or conductor is shown in U.S. Pat. No. 6,439,084. A laminated blade assembly includes a stationary blade and a pair of insulation supports and a movable blade and a pair of insulation supports with each blade sandwiched between a pair of supports. Semi-circular grooves formed in the insulation supports and smaller semi-circular grooves formed in blades in alignment with the insulation support grooves creating circular grooves to support and cut the insulation when the stationary and movable blades come together. The support semi-circular grooves of one of the stationary and movable insulation supports are located with their peripheries tangent to a straight line which is not parallel to the center lines of the blade semi-circular grooves. Accordingly, the wire and its insulation will not be bent during severing and insulation removal thus providing a clean cut.

However, while these prior art devices help to support the insulation and the conductor, the removal of the insulation is not always clean and with no damage to the conductor. It would, therefore, be advantageous to provide a stripping mechanism which has an added pulling force to properly remove the insulation, such that the stripped wire meets industry standards, such as, but not limited to, that in SAE AS5457, entitled Aerospace Standard for Hand-Held Wire Stripper Tools.

SUMMARY OF THE INVENTION

An exemplary embodiment is directed to an insulation stripping assembly for stripping insulation from a conductor. The blade assembly includes a first, fixed blade assembly and a second, movable blade assembly. The fixed blade assembly has a first cutting blade, and the second blade assembly has a second cutting blade. Clenching members are provided in the fixed blade assembly and the movable blade assembly. The clenching members are spaced from the first cutting blade and the second cutting blade. The first and second cutting blade essentially cut through the insulation and the clenching members engage the insulation to provide increased pulling force to remove the cut insulation from the conductor.

Another exemplary embodiment is directed to an insulation stripping assembly for stripping insulation from a conductor. The blade assembly includes a first blade assembly. The first blade assembly has a first cutting blade and a first clenching member, with the first clenching member spaced from the first cutting blade. The blade assembly also includes a second blade assembly. The second blade assembly has a second cutting blade and a second clenching member, with the second clenching member spaced from the first cutting blade. An insulation receiving slot for positioning the insulation therein is also provided. The first clenching member extends into the insulation receiving slot a distance less than the first cutting blade and the second clenching member extends into the insulation receiving slot a distance less than the second cutting blade. Wherein the first and second cutting blades essentially cut through the insulation and the first and second clenching members engage the insulation to provide increased pulling force to remove the cut insulation from the conductor.

Another exemplary embodiment is directed to an insulation stripping assembly for stripping insulation from a conductor. The blade assembly includes a first blade assembly. The first blade assembly has a first cutting blade and a first clenching blade, with the first clenching blade spaced from the first cutting blade. The blade assembly also includes a second blade assembly. The second blade assembly has a second cutting blade and a second clenching blade, with the second clenching blade spaced from the first cutting blade. An insulation receiving slot for positioning the insulation therein is also provided. The first clenching blade extends into the insulation receiving slot a distance less than the first cutting blade and the second clenching blade extends into the insulation receiving slot a distance less than the second cutting blade. Wherein the first and second cutting blades essentially cut through the insulation and the first and second clenching blades engage the insulation to provide increased pulling force to remove the cut insulation from the conductor.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
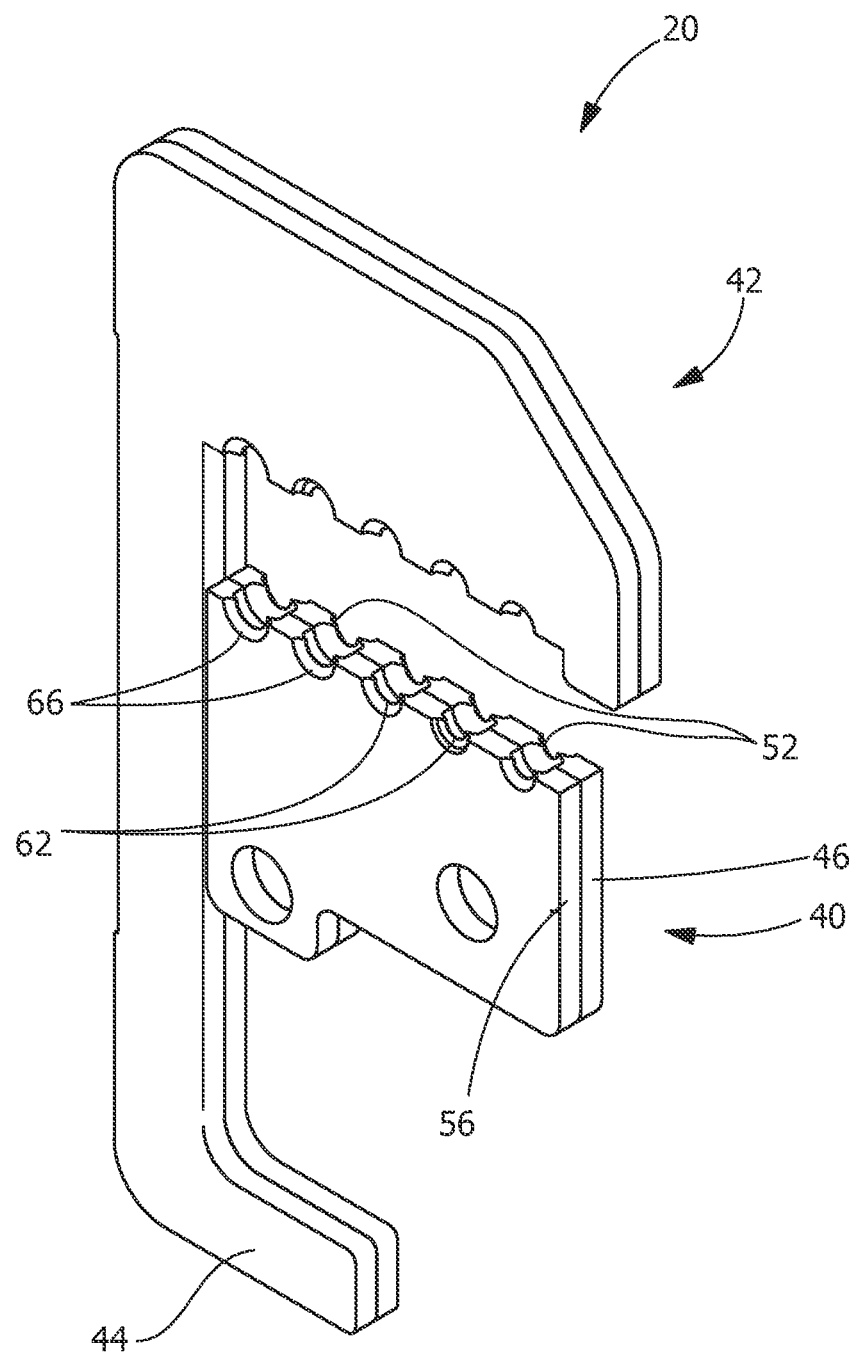
FIG. 1 is a perspective view of an exemplary cutting blade assembly of the present invention.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "upper", "lower" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

The cutting blade or insulation stripping assembly 20, an exemplary embodiment of which is shown in FIG. 1 is used for stripping insulation 12 from conductor wires 14 (as is shown in FIGS. 4 through 9). Blade assemblies of this type can be used in hand tools or other devices which are used to cut the insulation and remove the cut sleeve of insulation from a conductor wire. Such hand tools and other devices are generally known in the industry.

Referring to FIG. 1, the exemplary cutting blade assembly 20 is shown in an open position before placement of the insulated wires for cutting. The blade assembly 20 includes a fixed or stationary first blade assembly 40 and a movable second blade assembly 42 with a foot 44 formed integrally with the movable blade assembly 42. The foot 44 connects to a link (not shown) which is connected to a handle of a hand tool or other device in which the blade assembly 20 is used.

Figure 2:
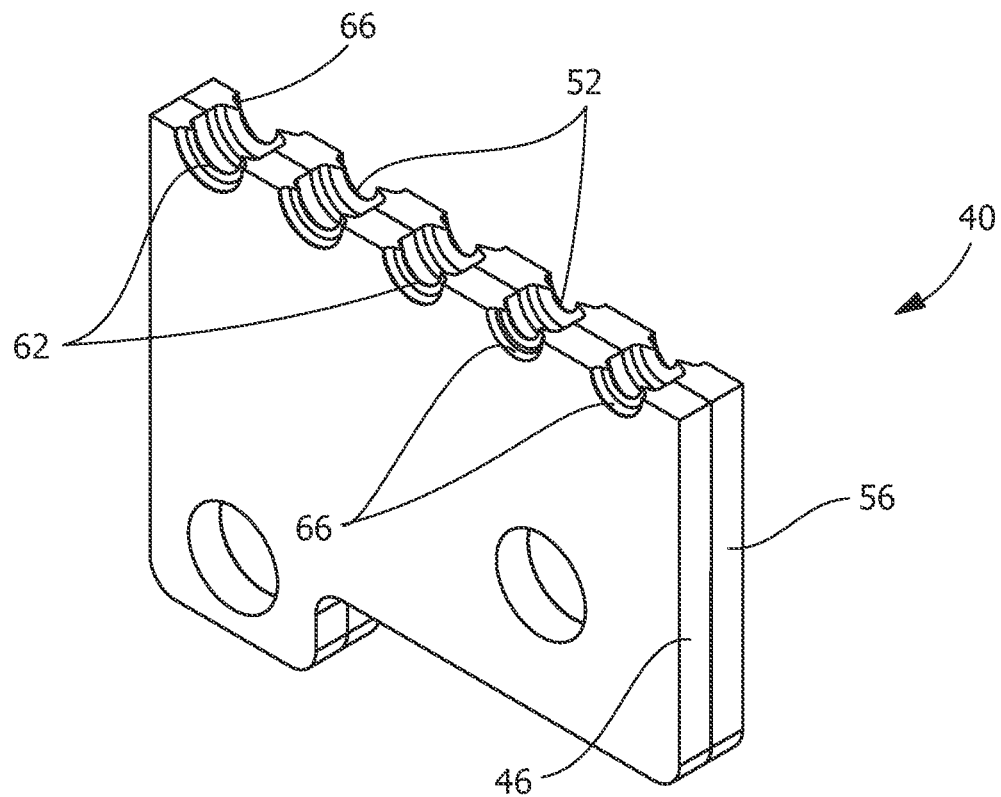
FIG. 2 is a top perspective view of a first, fixed blade assembly of the exemplary cutting blade assembly of FIG. 1.

As best shown in FIG. 2, the fixed blade assembly 40 has a fixed or stationary first cutting blade 46. Incline surfaces 50 (FIG. 4) formed on the fixed cutting blade 46 create a beveled cutting edge. Semicircular notches or slots 52 are formed in the inclined surfaces 50 of the cutting blade 46 and as is conventional, each of these notches may be of the same diameter or may of a different diameter, with each adapted to cut the insulation 12 from conductor wires 14 of a selected size.

The fixed blade assembly 40 also has a fixed or stationary first clenching member 56. The first cutting blade 46 and the first clenching member 56 are joined together using known methods, such as, but not limited to, welding or soldering. In the exemplary embodiment, fixed clenching member 56 is positioned proximate fixed cutting blade 46. However, other configurations of the first cutting blade 46 and the first clenching member 56 are envisioned without departing from the scope of the invention. In one such alternate embodiment, the first cutting blade 46 and the first clenching member 56 may be formed as a single piece which is positioned in a pocket provided in the fixed blade assembly.

An incline surface 160 (FIG. 4) formed on the movable clenching member 156 creates a beveled clenching blade or edge. Semicircular notches or slots 162 are formed in the inclined surface 160 of the movable clenching member 156. Each of these notches may be of a similar diameter or may be of a different diameter, with each adapted to engage, i.e. pierce, clench or grasp, the insulation 12 of conductor wires 14 of a selected size. The slots 162 are provided in alignment with respective slots 152. However, slots 162 have larger diameters than respective slots 152, thereby allowing the movable cutting blades 146 to cut essentially through the insulation 12 of the wire 14, while allowing the movable clenching member 156 to pierce the outer surface of the insulation 12 without cutting through the entire layer of insulation 12, as will be more fully described.

Figure 9:
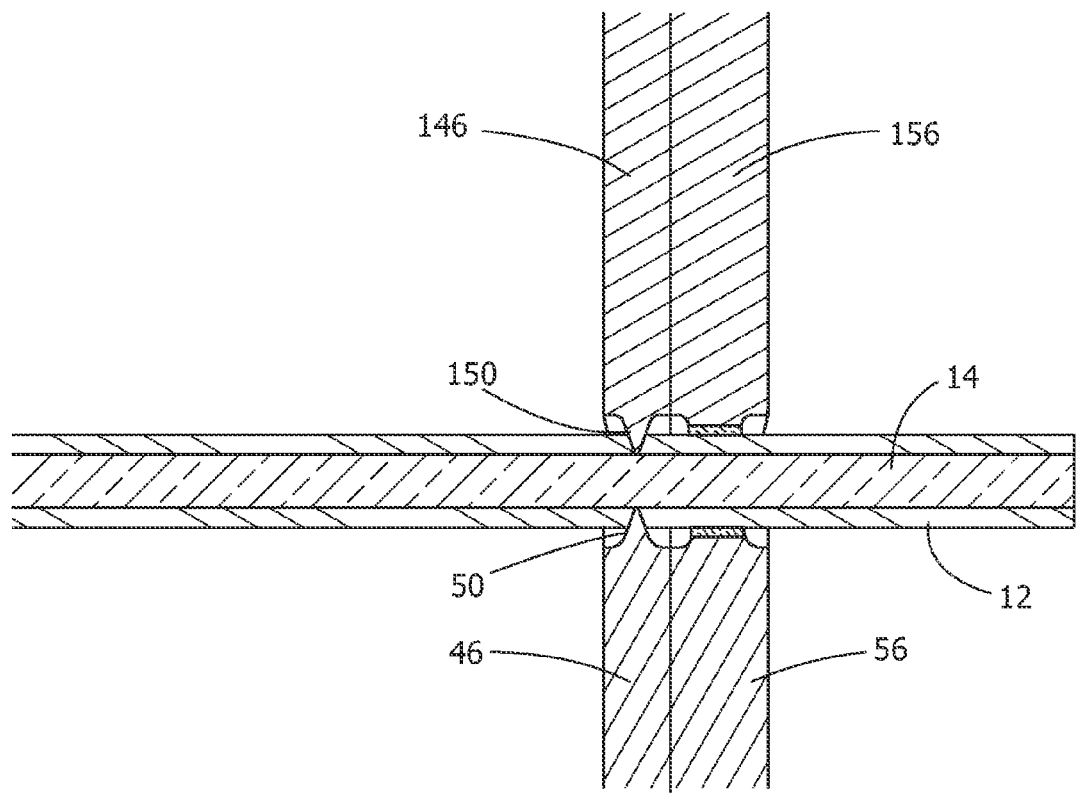
FIG. 9 is a cross-sectional view of a second exemplary alternate embodiment showing alternate clenching members on each blade assembly.

While the fixed clenching member 56 in the exemplary embodiment shows an inclined surface 60 to form a clenching blade, other configurations may be used without departing from the scope of the invention. As shown in FIG. 9, the surface 60 may be relatively flat with a soft high friction material, such as, but not limited to, chamois. This would allow the fixed clenching member to clench the insulation 12 over a wide surface area without compressing the insulation 12.

Figure 8:
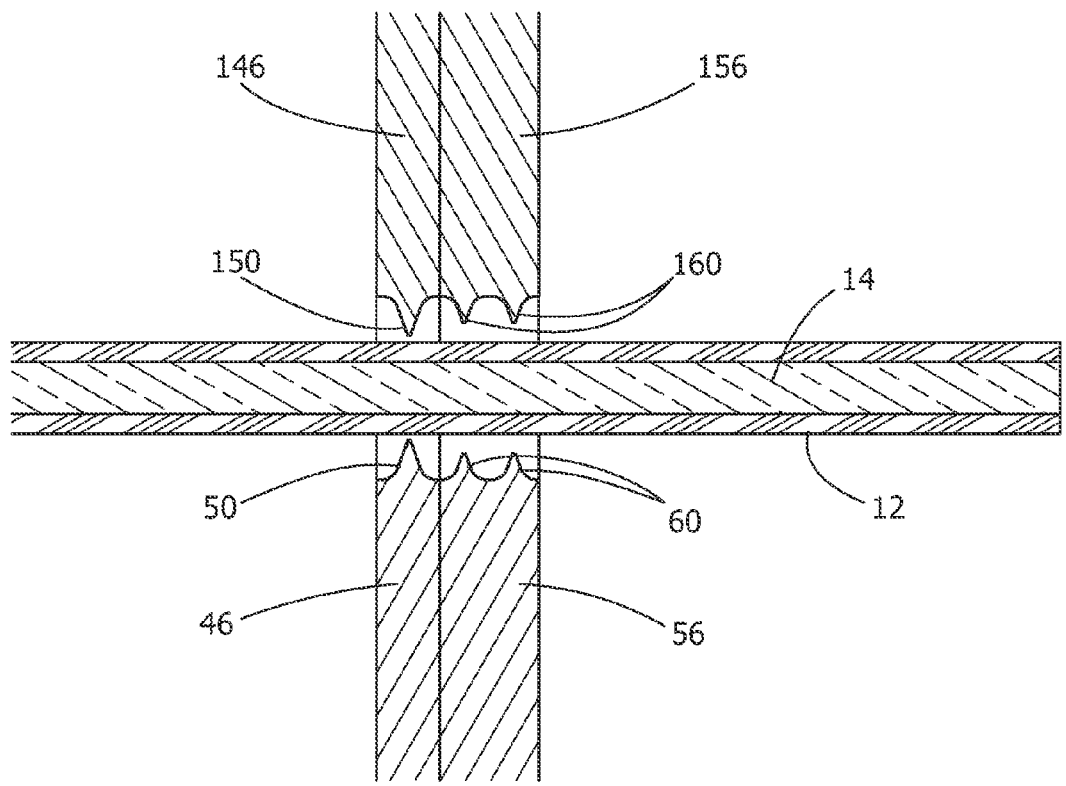
FIG. 8 is a cross-sectional view of a first exemplary alternate embodiment showing a plurality of clenching members on each blade assembly.

In the exemplary embodiment shown in FIGS. 1 through 7, only one fixed clenching blade is positioned on clenching member 56. However, as shown in FIG. 8, more than one fixed clenching blade may be provided on the clenching member 56, thereby providing a higher gripping action.

Support edges 66 are located on either side of cutting blade 46 and clenching member 58. The support edges 66 form a portions of an insulation receiving slot. In general, the insulation receiving slot is configured to be slightly larger than the maximum diameter of the wire to be stripped.

Figure 3:
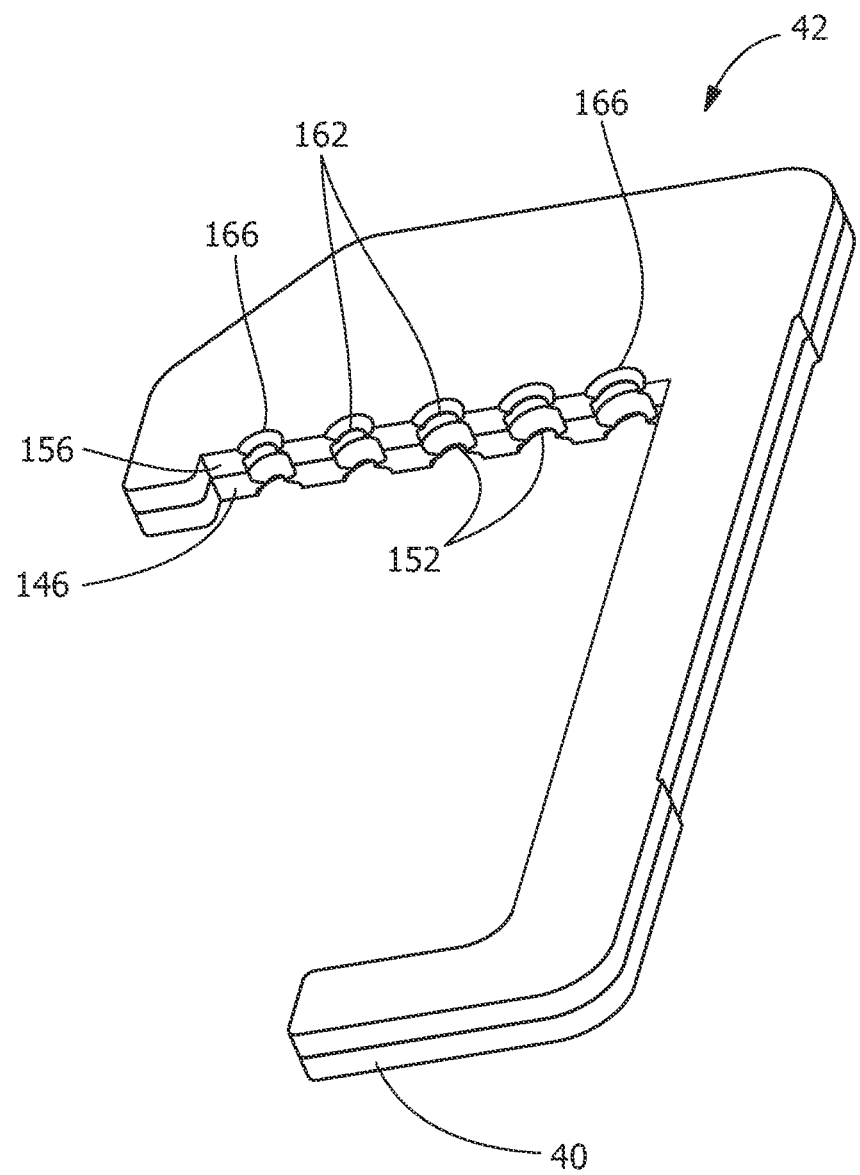
FIG. 3 is a bottom perspective view of a second, movable blade assembly of the exemplary cutting blade assembly of FIG. 1.
Figure 4:
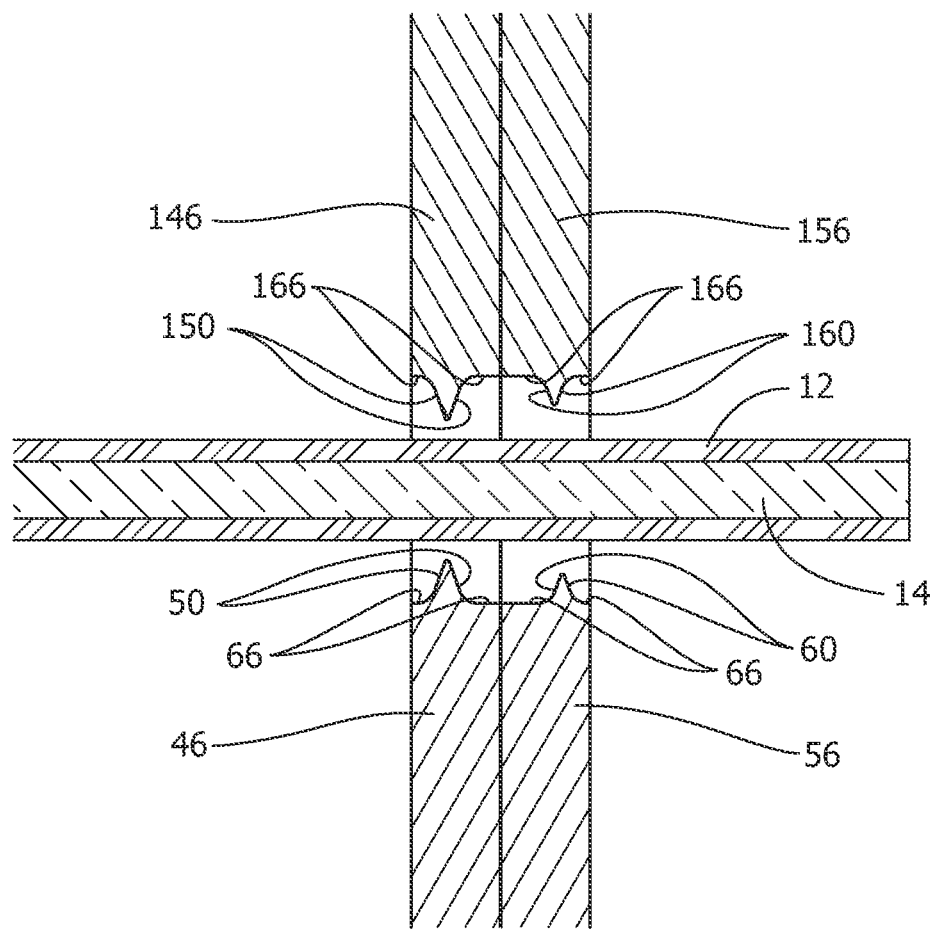
FIG. 4 is a cross-sectional view of the exemplary cutting blade assembly showing the first blade assembly and the second blade assembly in an open position, with a wire positioned therebetween.
Figure 5:
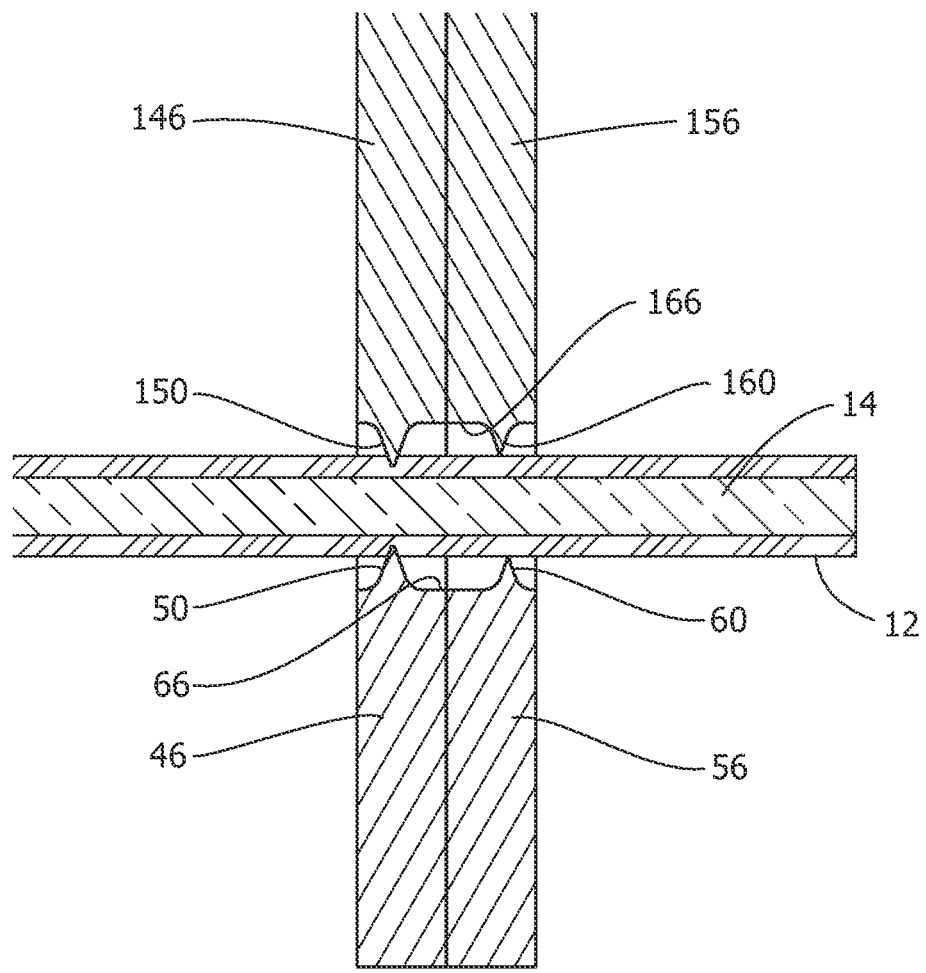
FIG. 5 is a cross-sectional view of the exemplary cutting blade assembly showing the first blade assembly and the second blade assembly in a partially closed position.

Referring to FIG. 3, the movable blade assembly 42 has a movable second cutting blade 146. As best shown in FIG. 4, incline surfaces 150 formed on the movable cutting blade 146 creates a beveled cutting edge. Semicircular notches or slots 152 are formed in the inclined surfaces 150 of the movable cutting blade 146 and as is conventional, each of these notches may be of a similar diameter or may be of a different diameter, with each adapted to cut the insulation 12 from conductor wires 14 of a selected size.

The movable blade assembly 42 also has a movable second clenching member 156. The movable second cutting blade 146 and the movable second clenching blade 156 are joined together using known methods, such as, but not limited to, welding or soldering. In the exemplary embodiment shown, movable clenching member 156 is positioned adjacent movable cutting blade 146. However, other configurations of the second cutting blade 146 and the second clenching member 156 are envisioned without departing from the scope of the invention. In one such alternate embodiment, the second cutting blade 146 and the second clenching member 156 may be formed as a single piece which is positioned in a pocket provided in the movable blade assembly.

An incline surface 160 (FIG. 4) formed on the movable clenching member 156 creates a beveled clenching blade or edge. Semicircular notches or slots 162 are formed in the inclined surface 160 of the movable clenching member 156. Each of these notches may be of a similar diameter or may be of a different diameter, with each adapted to engage, i.e. pierce, clench or grasp, the insulation 12 of conductor wires 14 of a selected size. The slots 162 are provided in alignment with respective slots 152. However, slots 162 have larger diameters than respective slots 152, thereby allowing the movable cutting blades 146 to cut essentially through the insulation 12 of the wire 14, while allowing the movable clenching member 156 to pierce the other surface of the insulation 12 without cutting through the entire layer of insulation 12, as will be more fully described.

While the movable clenching member 156 in the exemplary embodiment shows an inclined surface 160 to form a clenching blade, other configurations may be used without departing from the scope of the invention. As shown in FIG. 9, the surface 160 may be relatively flat with a soft high friction material, such as, but not limited to, chamois. This would allow the movable clenching member to clench the insulation 12 over a wide surface area without compressing the insulation 12.

In the exemplary embodiment shown in FIGS. 1 through 7, only one movable clenching blade is positioned on clenching member 156. However, as shown in FIG. 8, more than one movable clenching blade may be provided on clenching member 156, thereby providing a higher gripping action.

Support edges 166 are located on either side of cutting blade 146 and clenching member 158. The support edges 166 cooperate with the support edges 66 to form insulation receiving slots. In general, each insulation receiving slot is configured to be slightly larger than the maximum diameter of the wire to be stripped.

While the exemplary embodiment of the cutting blade assembly 20 is shown with blades positioned on members which are welded or soldered together, other configurations of the cutting blade assembly 20 can be used without departing from the scope of the invention. As a first alternate example, the cutting blade and the clenching member may be separate pieces which are inserted into pockets of the blade assembly. As a second alternate embodiment, the cutting blade, the clenching member and the blade assembly may all be manufactured from one piece.

In the exemplary embodiment described, a clenching member 56 is provided on the fixed blade assembly 40 and a clenching member 156 is provided on the movable blade assembly 42. However, different types of clenching members may be provided on the fixed blade assembly 40 and the movable blade assembly 42. As an example, a blade type clenching member may be provided on the fixed blade assembly 40 while a high friction clenching member may be provided on the movable blade assembly 42.

While the clenching member 56 and the clenching member 156 are shown with one projection formed by the inclined surfaces 60, 160 which extend about the entire circumference of the notches, each clenching member 56, 156 may be comprised of multiple projections formed by multiple inclined surfaces periodically spaced about the circumference of the notches. Other configurations are also possible without departing from the scope of the invention. In addition, the inclined surface 60, 160 may be aligned essentially perpendicular to the longitudinal axis of the wire 14, as shown, or may be positioned at other angles relative to the longitudinal axis of the wire 14.

In the exemplary embodiment shown, the first blade assembly 40 is fixed and the second blade assembly 42 is movable. However, in one alternate exemplary embodiment, the first blade assembly 40 may be movable and the second blade assembly 42 may be fixed. In another alternate exemplary embodiment, the first blade assembly 40 and the second blade assembly 42 may both be movable.

Referring to FIGS. 4 through 7, the operation of the cutting blade assembly 20 will now be described. Initially, as shown in FIG. 4, the wire 14 is positioned between the fixed blade assembly 40 and the movable blade assembly 42. The wire 14 is positioned in alignment with the respective notches which correspond to the diameter of the wire. As is shown, and as was previously described, the cutting blades 46, 146 extend from the respective support edges 66, 166 a further distance than the clenching members 56, 156.

Figure 6:
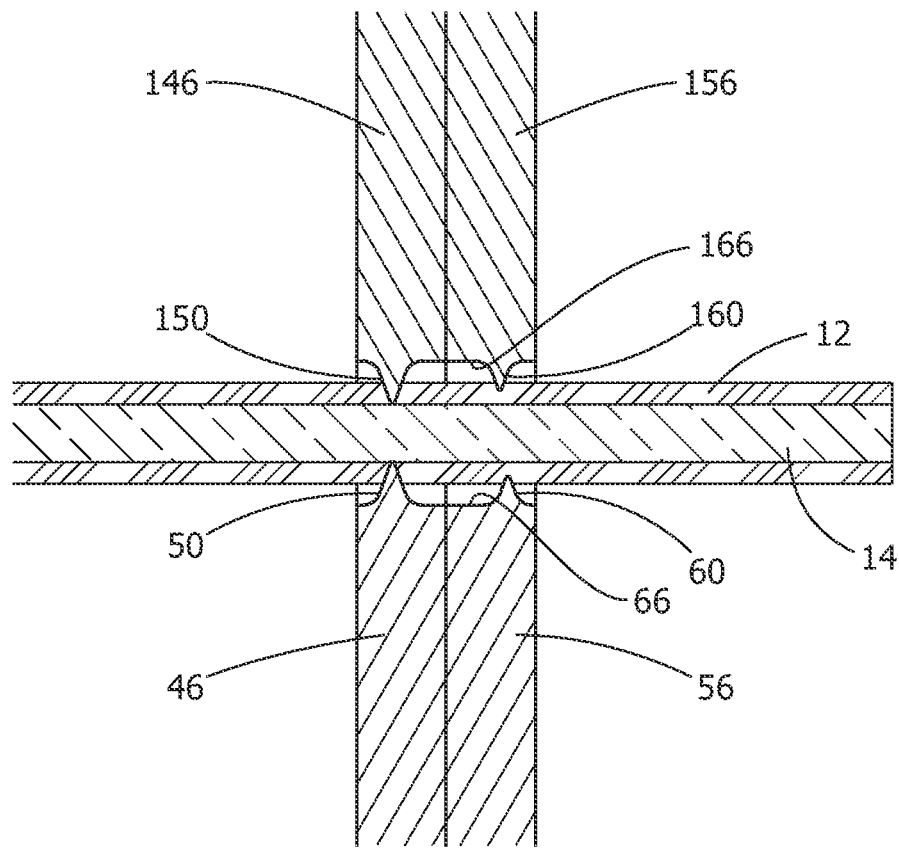
FIG. 6 is a cross-sectional view of the exemplary cutting blade assembly showing the first blade assembly and the second blade assembly in a closed position, with cutting blades cutting essentially through the insulation of the wire and the clenching member piercing the insulation.
Figure 7:
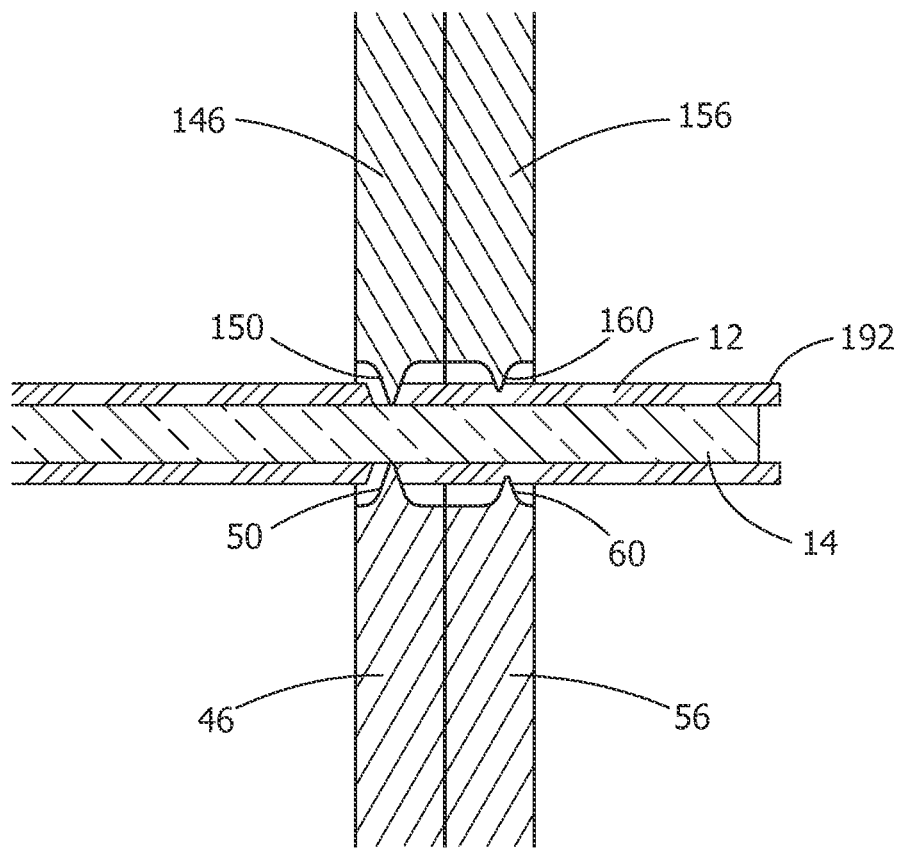
FIG. 7 is a cross-sectional view of the exemplary cutting blade assembly showing the first blade assembly and the second blade assembly in a closed position and the cutting blade assembly being moved relative wire to remove the insulation therefrom.

The movable blade assembly 42 is then moved to the position shown in FIG. 6. In this position, the fixed cutting blade 46 and the movable cutting blade 146 initially engage the insulation 12 of the wire 14. As the movement of the movable blade assembly 42 toward the fixed blade assembly 40 continues, the fixed cutting blade 46 and the movable cutting blade 146 pierce the insulation 12 of the wire 14, cutting the insulation 12 as is known. The use and operation of the fixed cutting blade 46 and the movable cutting blade 146 is known in the industry.

As the movement of the movable blade assembly 42 toward the fixed blade assembly 40 continues, the fixed clenching member 56 and the movable clenching member 156 engage the insulation 12 of the wire 14. In the exemplary embodiment shown, the fixed clenching member 56 and the movable clenching member 156 pierce the insulation 12 of the wire 14.

Movement of the movable blade assembly 42 toward the fixed blade assembly 40 continues until the movable blade assembly 42 engages the fixed blade assembly 40 which defines a closed position, as shown in FIG. 6. In this position, the wire receiving slot is formed by the support edges 66, 166. As the cutting blades 46, 146 have a smaller diameter than the support edges 66, 166, the cutting blades 46, 146 extend into the insulation receiving slot. Similarly, as the clenching members 56, 156 have a smaller diameter than the support edges 66, 166, the clenching members 56, 156 also extend into the insulation receiving slot. However, as the clenching members 56, 156 have a larger diameter than the cutting blades 46, 146, the clenching members 56, 156 do not extend into the insulation receiving slot, or the insulation 12 of the wire 14, as far as the cutting blades 46, 146.

In the position shown in FIG. 6, the cutting blades 46, 146 have essentially cut through the insulation 12 without damaging or engaging the conductors of the wire 14. However, due to tolerance variations in the tool and the wire 14, it is often the case that the insulation 12 is not fully cut-through. In the closed position, the blade of the clenching members 56, 156 piece the insulation 12 of the wire 14. In this position, the support edges 66, 166 provide support to the insulation 12 of the wire 14.

With the movable blade assembly 42 and the fixed blade assembly 40 in the closed position, the tool 10 is moved in the direction indicated by arrow 190 shown in FIG. 8 to remove the slug 192 of the insulation 12 from the wire 14. As this occurs, the clenching members 56, 156 are in engagement with the insulation of the slug 192. Consequently, as the movable blade assembly 42 and the fixed blade assembly 40 are moved in the direction of arrow 190, the clenching members 56, 156 engage the slug 192 and provide an additional force to the slug 192 in the direction of arrow 190. This additional pulling force moves the slug 192 away from the remaining wire 14. While this facilitates the removal of the slug 192 in general, the increased pulling force supplied by the clenching members 56, 156 is particularly advantageous when the cutting blades 46, 146 have not fully cut-through the insulation 12. The additional force supplied by the clenching members 56, 146 allows any portion of the insulation 12 which has not be cut to be torn away. This controlled pulling force supplied by the clenching members 56, 156 provides for the type of clean insulation stripping action required to properly remove the slug 192 from the wire 14.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An insulation stripping assembly for stripping an insulation slug from a conductor, the insulation stripping assembly comprising:
 a first blade assembly, the first blade assembly having a first cutting blade;
 a second blade assembly, the second blade assembly having a second cutting blade;
 a first clenching member positioned on the first blade assembly, the first clenching member extending into an insulation receiving slot a distance less than the first cutting blade, a second clenching member positioned on the second blade assembly, the second clenching member extending into the insulation receiving slot a distance less than the second cutting blade, the first clenching member being spaced from the first cutting blade and the second clenching member being spaced from the second cutting blade, the first and second clenching members are blades positioned to cooperate with the insulation slug;
 support surfaces are provided proximate the first cutting blade and the first clenching member and proximate the second cutting blade and the second clenching member, the support surfaces define the insulation receiving slot;
 wherein the first and second cutting blade essentially cut through the insulation and the first and second clenching members pierce an outer layer of the insulation slug, wherein as the insulation stripping assembly is moved toward the insulation slug, the first blade assembly, the second blade assembly, the first clenching member and the second clenching member engage the insulation slug to provide increased pulling force to remove the insulation slug from the conductor.

2. The insulation stripping assembly as recited in claim 1, wherein the first blade assembly is fixed.

3. The insulation stripping assembly as recited in claim 1, wherein the second blade assembly is movable.

4. The insulation stripping assembly as recited in claim 1, wherein a plurality of first and second clenching members are provided.

5. A insulation stripping assembly for stripping an insulation slug from a conductor, the blade assembly comprising:
 a first blade assembly, the first blade assembly having a first cutting blade and a first clenching member, the first clenching member being spaced from the first cutting blade, the first clenching member cooperates with the insulation slug to be removed from the conductor, the first clenching member having first inclined surfaces to form a first clenching blade;
 a second blade assembly, the second blade assembly having a second cutting blade and a second clenching member, the second clenching member being spaced from the first cutting blade, the second clenching member cooperates with the insulation slug to be removed from the conductor, the second clenching member having second inclined surfaces to form a second clenching blade;
 an insulation receiving slot for positioning insulation of the conductor therein;
 support surfaces are provided proximate the first cutting blade and the first clenching member and proximate the second cutting blade and the second clenching member, the support surfaces define the insulation receiving slot;
 the first clenching member extending into the insulation receiving slot a distance less than the first cutting blade, the first clenching member positioned to pierce outer insulation of the insulation slug, the second clenching member extending into the insulation receiving slot a distance less than the second cutting blade, the second clenching member positioned to pierce the outer insulation of the insulation slug at a position opposite the first clenching member;
 wherein the first and second cutting blades essentially cut through the insulation and the first and second clenching members pierce the outer insulation of the insulation slug, wherein as the insulation stripping assembly is moved toward the insulation slug, the first and second clenching members pierce the outer insulation of the insulation slug to provide increased pulling force to remove the insulation slug from the conductor.

6. The insulation stripping assembly as recited in claim 5, wherein a plurality of first and second clenching members are provided.

7. The insulation stripping assembly as recited in claim 5, wherein the first blade assembly is fixed.

8. The insulation stripping assembly as recited in claim 5, wherein the second blade assembly is movable.

9. A insulation stripping assembly for stripping an insulation slug from a conductor, the insulation stripping assembly comprising:
 a first blade assembly, the first blade assembly having a first cutting blade and a first clenching blade which cooperates with the insulation slug to be removed from the conductor, the first clenching blade being spaced from the first cutting blade;
 a second blade assembly, the second blade assembly having a second cutting blade and a second clenching blade which cooperates with the insulation slug to be removed from the conductor, the second clenching blade being spaced from the first cutting blade;

an insulation receiving slot for positioning insulation of the conductor therein;

support surfaces are provided proximate the first cutting blade and the first clenching blade and proximate the second cutting blade and the second clenching blade, the support surfaces define the insulation receiving slot;

the first clenching blade extending into the insulation receiving slot a distance less than the first cutting blade, the first clenching member positioned to pierce outer insulation of the insulation slug, the second clenching blade extending into the insulation receiving slot a distance less than the second cutting blade, the second clenching blade positioned to pierce the outer insulation of the insulation slug at a position opposite the first clenching blade;

wherein the first and second cutting blades essentially cut through the insulation and the first and second clenching blades pierce the outer insulation of the insulation slug, wherein as the insulation stripping assembly is moved toward the insulation slug, the first and second clenching blades pierce the outer insulation of the insulation slug to provide increased pulling force to remove the insulation slug from the conductor.

10. The insulation stripping assembly as recited in claim 9, wherein a plurality of first clenching blades are provided on the first blade assembly and a plurality of second clenching blades are provided on the second blade assembly.

\* \* \* \* \*